F. H. ELWELL.
PUMP VALVE.
APPLICATION FILED MAY 2, 1912.
1,045,534. Patented Nov. 26, 1912.
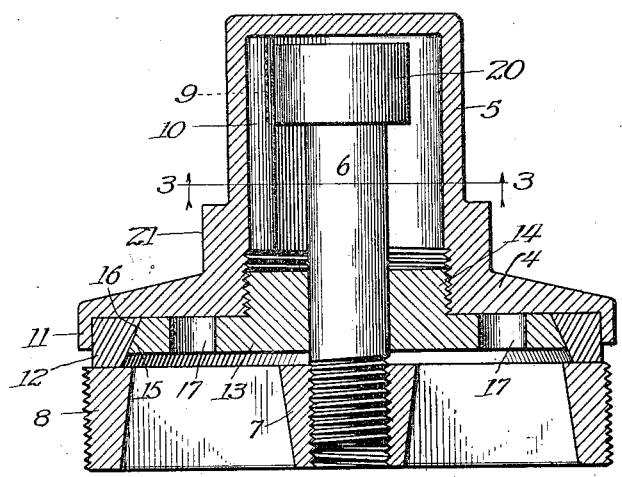
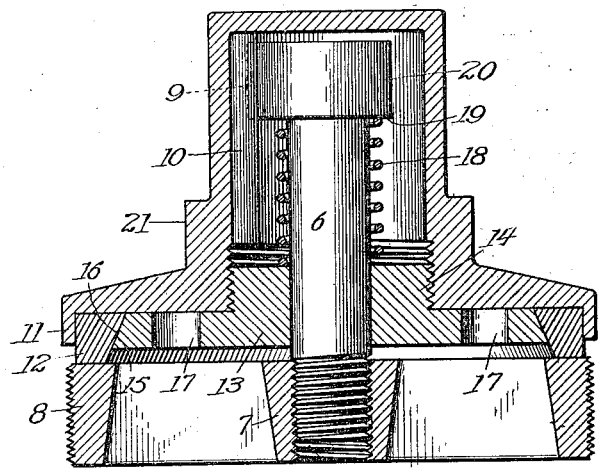
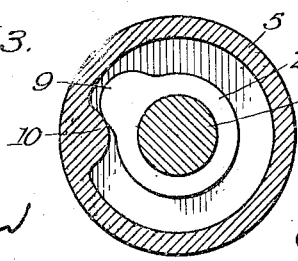
Witnesses:
Robt H. Weir
Mildred Elmer
Inventor
Franklin H. Elwell
Jno. G. Elliott
Atty.

UNITED STATES PATENT OFFICE.

FRANKLIN H. ELWELL, OF CHICAGO, ILLINOIS.

PUMP-VALVE.

1,045,534.   Specification of Letters Patent.   Patented Nov. 26, 1912.

Application filed May 2, 1912. Serial No. 694,673.

*To all whom it may concern:*

Be it known that I, FRANKLIN H. ELWELL, a citizen of the United States, and a resident of Chicago, in the county of Cook and State of Illinois, have invented certain new and useful Improvements in Pump-Valves, of which the following is a full, clear, and exact specification.

This invention relates to improvements in pump valves comprising a dome-like casing in which an annular gasket is clamped and locked in its operative position against the base thereof by a disk screwed into the casing, which disk is sleeved on a valve stem screwed into the valve seat, and projecting into the casing against which the stem can have no contact and the valve is therefore, entirely free to make a complete revolution around the stem, the disk being provided with perforations for the reception of a wrench for tightening it in the casing when operated in conjunction with another wrench applied to the dome of the valve to hold one or the other of these members fixed, while turning the other for screwing the disk into the casing, and which may be by turning these two wrenches simultaneously in opposite directions, a spring encircling the valve stem being employed for accelerating the movement of the valve toward its seated position, and therefore tending to force the disk away from the casing when screwing it therein to place for tightening the gasket against the casing. It is possible to assemble the casing, the disk, the gasket and the valve stem with its surrounding spring in their operative positions, but when once assembled it is impossible to secure the valve by screwing it into the valve seat, as must be for the operation of the valve, and for the reason that the valve stem is inaccessible for that purpose, except it be possible to pass a wrench between the gasket and the valve seat concurrently with lifting the valve on its stem against the pressure of the spring throughout the screwing of the stem into the valve seat, and which, at best, is seriously objectionable because of the time, skill and strength required to compress the spring with one hand, while turning the stem to place in the hub.

The prime object of my invention is to have a connection between the casing of the valve stem, whereby after completely assembling the several parts of the valve structure including the stem, a single wrench applied to the valve casing will serve to screw the valve stem to place in the valve seat, and likewise serve to quickly detach the valve stem from that seat when for any purpose access is desired to the latter, the gasket, or the spring.

A further object of my invention is to have the relative distance between the upper end of the valve stem and the casing, and that between the gasket and the valve seat such that the casing will strike the end of the valve stem, and by the noise of its strike thereby indicate to the attendant, before the valve casing can possibly strike and injure the seat, that the gasket is so far worn down as to require the substitution of a new gasket.

With these ends in view, my invention finds embodiment in certain features of novelty in the construction, combination and arrangement of parts by which the said objects and certain other objects are hereinafter attained, all as fully described with reference to the accompanying drawings, and more particularly pointed out in the claims.

In said drawing: Figure 1 illustrates a vertical section through a valve and its seat with the valve stem shown in full lines, in which my invention finds embodiment. Fig. 2 is a similar view showing the employment of a spring for accelerating the seating of the valve; and, Fig. 3 is a transverse section on the line 3—3 of Fig. 1 looking in the direction of the arrows.

Similar characters of reference indicate the same parts in the several figures of the drawing.

4 indicates a valve body having integrally formed therewith a hollow dome 5, into which projects a valve stem 6, the opposite end of which is screwed into the hub 7 of the valve seat 8. Valve stem 6 terminates below the top of the dome 5, and is provided toward its upper end with a lug 9 laterally projecting therefrom in the path of a vertical internal rib 10 cast with the dome 5 and together with the lug 9 forming a stop limiting the rotation of the dome about the stem, for the purpose hereinafter described. Formed with the body 4 is a depending annular flange 11 laterally opposing a gasket 12 of rubber, but which may be of soft metal if desired, held against the flange by an annular disk 13, which, together with its hub 14 surrounds and is loose upon the valve stem, the perimeter of the annular disk being beveled as shown at 15 and opposing a corresponding bevel 16 on the inner side face of the gasket 12 so that on screwing the hub 14 of the annular disk 13 into the casing 4 the gasket is adjustably wedged with any desired degree of force between the disk and the annular flange 11. As a convenient means for screwing the hub 14 into the casing the annular disk 13 is provided with two or more perforations 17 to receive a spanner wrench.

The depth of the gasket is such that when tightened in its operative position it projects both below the flange 11 and its annular clamping disk 13 to a seating position upon the valve seat 8 to form a tight joint between the valve and its seat. It should now be observed that for the purpose of preventing the use of the gasket after it is so far worn away as to substantially prevent its successful operation and the valve body from striking and injuring the valve seat, the distance between the upper end of the valve stem and the top of the valve body is, when a perfect gasket is in its seated position, less than the distance between the edge of the flange 11 of the valve body and the seat, with the result that when the gasket is so far worn down that its seating is substantially imperfect, the top of the valve body will strike the end of the valve stem and the sound of this striking signals the operator that the gasket is so far worn out as to require the substitution of a new and unworn gasket.

For assembling the valve structure the stem is inserted to its operative position in the valve body, the gasket placed in its operative position therein followed by the screwing of the disk 13 to its operative position in the valve body until the face of the disk is tight against the opposing surface of the valve body as may be by the insertion of a spanner wrench in the perforations 17 and finally when so assembled by screwing the stem into the hub 7 of the valve seat until it is tightened, the distance between the end of the stem and the top of the valve body is less than the distance between the valve 11 and the seat 8. It will now be observed that the valve body is provided with a shoulder 21 forming a hold for a wrench for turning the valve structure and without the stem until the stem is screwed to place as may be, because of the engagement of the lug 9 on the stem with the vertical rib 10 in the dome of the valve body.

For ordinary purposes the weight of the casing together with its dome, the disk 13 and its hub 14, and that of the gasket is sufficient to cause the valve to seat by gravity and which, of course, is seated by the pressure of the water above the valve when the pump is running, but if desired and as shown in Fig. 3, the seating of the valve may be quickened by means of a spring 18 coiled about the valve stem 6 bearing at its lower end against the hub 14, and at its upper end against a shoulder 19 formed by an enlargement 20 on the upper end of the valve stem.

It will now be observed that with the construction described, my invention secures all the advantages accruing to the economy, simplicity of construction, durability of, and accessibility to the several parts of a valve in which, severally, the casing, the annular gasket, the clamping disk therefor are in one piece and the valve stem is screwed into the valve seat, while at the same time my invention not only makes its possible and practical to completely assemble all of its parts and secure a valve structure in its operative position above its seat by the use of a single wrench in the absence of any other or further force, and in the simplest and quickest possible manner, with a minimum expenditure of force on the part of the attendant. That I am enabled to utilize all the advantages accruing to the manufacture and assembling, and accessibility to and use of such a valve structure, and at the same time provide means by which it will audibly automatically signal the attendant before it is possible for the metal of the valve casing to strike its seat, or the disk to strike its seat, that the gasket is so far worn as to require its replacing with a new gasket.

Furthermore, my invention not only provides for securing all of these desirable advantages and in addition provides a single joint valve structure adapted for the use of a gasket which forms a tight joint between the valve and its seat. The construction further eliminates the necessity of machine parts, other than the cutting of screw threads in the casing and opposing screw threads on the integral hub of a disk adjustably clamping the gasket to the casing.

In conclusion it should further be observed that the accumulation of water in the dome through leakage around the valve stem will not retard the seating of the valve by gravity for the reason that the diameter of the dome is so much greater than that of the greatest diameter of the stem that there can be no piston like action by which the reciprocation of the valve on the stem will compress the water in the dome.

Having described my invention, what I claim and desire to secure by Letters Patent is:

1. A pump valve comprising in combination a dome-like body portion, a valve seat, a valve stem fixed in said seat and projecting into the dome, and means between the valve body and the stem whereby the valve is free to oscillate on its axis, for shifting the valve relative to its seat, and that the valve stem may be screwed into said seat on revolving the valve body.

2. A pump valve comprising in combination a dome-like body, a valve seat, a valve stem fixed in said seat, and projecting into the dome, a gasket, a tightening disk therefor screwed into said body, a lug projecting from the upper end of said stem, a stop fixed to the wall of the valve body, whereby the stem may be screwed to place on turning the valve body, substantially as described.

In witness whereof, I have hereunto set my hand and affixed my seal, this 20th day of April, A. D. 1912.

FRANKLIN H. ELWELL. [L. S.]

Witnesses:
 JNO. G. ELLIOTT,
 MILDRED ELSNER.

Copies of this patent may be obtained for five cents each, by addressing the "Commissioner of Patents, Washington, D. C."